(12) United States Patent
He et al.

(10) Patent No.: US 12,289,767 B2
(45) Date of Patent: Apr. 29, 2025

(54) RA-RNTI FORMULA FOR EXTENDED RANDOM ACCESS RESPONSE WINDOWS

(71) Applicant: QUALCOMM Incorporated, San Diego, CA (US)

(72) Inventors: Linhai He, San Diego, CA (US); Ruiming Zheng, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 17/434,718

(22) PCT Filed: Feb. 28, 2020

(86) PCT No.: PCT/CN2020/077145
§ 371 (c)(1),
(2) Date: Aug. 27, 2021

(87) PCT Pub. No.: WO2020/192357
PCT Pub. Date: Oct. 1, 2020

(65) Prior Publication Data
US 2022/0132584 A1 Apr. 28, 2022

(30) Foreign Application Priority Data
Mar. 28, 2019 (WO) ................ PCT/CN2019/080112

(51) Int. Cl.
*H04W 72/02* (2009.01)
*H04W 74/0833* (2024.01)

(52) U.S. Cl.
CPC ............................ *H04W 74/0833* (2013.01)

(58) Field of Classification Search
CPC ......... H04W 72/1273; H04W 74/0833; H04W 74/02; H04W 72/23; H04L 1/0013
See application file for complete search history.

(56) References Cited

U.S. PATENT DOCUMENTS 10,425,973 B2   9/2019 Patel et al.
2014/0301330 A1  10/2014 Lee et al.
(Continued)

FOREIGN PATENT DOCUMENTS

CN      104619037 A      5/2015
CN      106105366 A      11/2016
(Continued)

OTHER PUBLICATIONS

International Search Report and Written Opinion—PCT/CN2020/077145—ISA/EPO—May 29, 2020.
(Continued)

*Primary Examiner* — Anez C Ebrahim
(74) *Attorney, Agent, or Firm* — Procopio, Cory, Hargreaves & Savitch LLP/Qualcomm

(57) ABSTRACT

A configuration for multiple UEs having the same RA-RNTI to generate RA-RNTI for RACH procedures. The apparatus transmits a random access message. The apparatus receives a RAR during a RAR window in response to the random access message. The RAR window spanning at least two system frames. The apparatus determines one or more RA-RNTIs. Each RA-RNTI may be based, at least in part, on a random access channel occasion and type of random access procedure. The apparatus decodes the RAR based on the one or more RA-RNTIs.

28 Claims, 12 Drawing Sheets

(56) References Cited

U.S. PATENT DOCUMENTS

| | | | |
|---|---|---|---|
| 2015/0124746 A1 | 5/2015 | Wu et al. | |
| 2017/0019930 A1 | 1/2017 | Lee et al. | |
| 2017/0215207 A1 | 7/2017 | Yi et al. | |
| 2018/0359784 A1* | 12/2018 | Agiwal | H04W 74/0833 |
| 2018/0368181 A1 | 12/2018 | Lee et al. | |
| 2019/0090282 A1 | 3/2019 | Shi et al. | |
| 2020/0178318 A1* | 6/2020 | Yu | H04W 74/006 |
| 2021/0266901 A1* | 8/2021 | Zhu | H04W 72/0453 |
| 2021/0385854 A1* | 12/2021 | Wu | H04W 74/02 |

FOREIGN PATENT DOCUMENTS

| | | | |
|---|---|---|---|
| CN | 106559905 A | 4/2017 | |
| CN | 106941730 A | 7/2017 | |
| CN | 106973441 A | 7/2017 | |
| CN | 108737039 A | 11/2018 | |
| WO | 2017091693 A1 | 6/2017 | |

OTHER PUBLICATIONS

International Search Report and Written Opinion—PCT/CN2019/080112—ISA/EPO—Jan. 2, 2020.

Samsung Electronics: "Supporting RAR Window Size Larger than 10ms", 3GPP TSG-RAN2 105, R2-1900137 MAC TP_Supporting RAR Window Size Larger Than Toms in NR-U, 3rd Generation Partnership Project, Mobile Competence Centre, 650, Route Des Lucioles, F-06921 Sophia-Antipolis, vol. RAN WG2, No. Athens, Greece, Feb. 25, 2019-Mar. 1, 2019, 2 Pages, Feb. 14, 2019, XP051601537, paragraph [5.1.3].

Supplementary European Search Report—EP20779505—Search Authority—The Hague—Oct. 21, 2022.

Xiaomi Communications: "Consideration on Extending RAR Window Size", 3GPP TSG-RAN #105, R2-1901907, 3rd Generation Partnership Project, Mobile Competence Centre, 650, Route Des Lucioles, F-06921 Sophia-Antipolis, Cedex, France, vol. RAN WG2, No. Athens, Greece, Feb. 25, 2019-Mar. 1, 2019, 2 Pages, Feb. 15, 2019, XP051603256, paragraph [0001]-paragraph [0002].

* cited by examiner

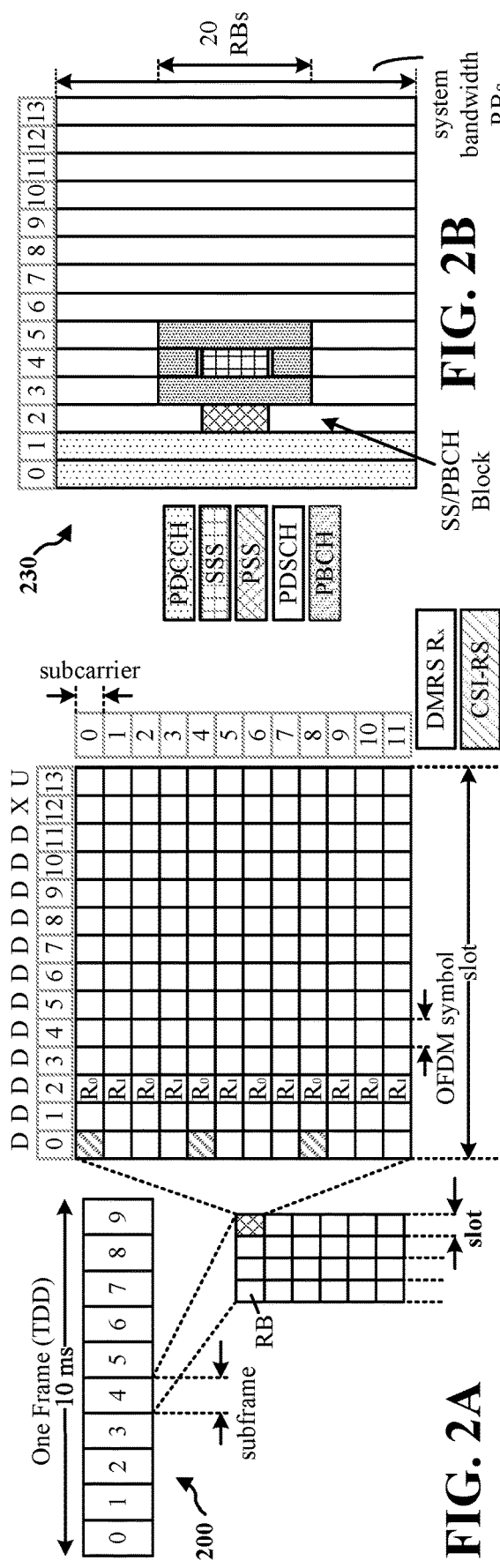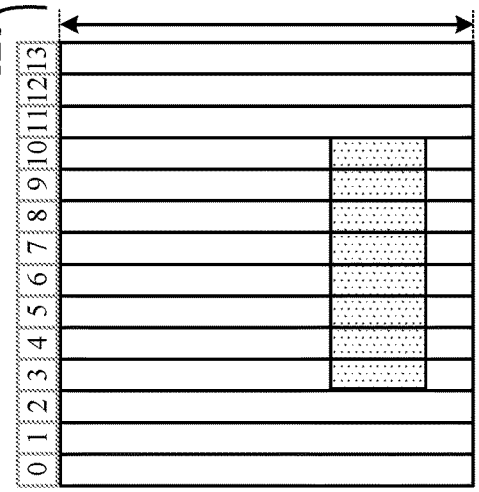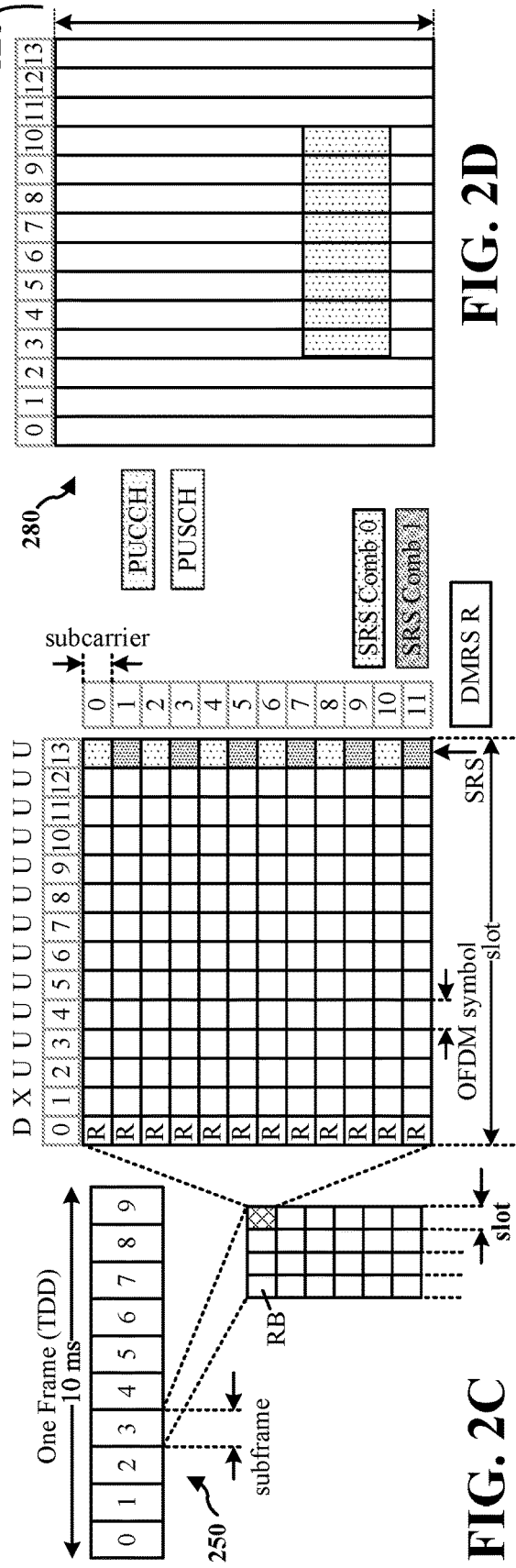
FIG. 2A  FIG. 2B  FIG. 2C  FIG. 2D

RA-RNTI FORMULA FOR EXTENDED RANDOM ACCESS RESPONSE WINDOWS

CROSS REFERENCE TO RELATED APPLICATION(S)

This application is a National Stage Application filed under 35 U.S.C. § 371 of PCT International Patent Application Serial No. PCT/CN2020/077145, entitled "RA-RNTI Formula for Extended Random Access Response Windows", and filed on Feb. 28, 2020, which claims the benefit of International Application No. PCT/CN2019/080112, entitled "RA-RNTI Formula for Extended Random Access Response Windows" and filed on Mar. 28, 2019, which is expressly incorporated by reference herein in its entirety.

BACKGROUND

Technical Field

The present disclosure relates generally to communication systems, and more particularly, to random access procedures in wireless communications networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A random access or random access channel (RACH) procedure may be performed between a user equipment (UE) and a base station in order for the UE to connect or initialize with the base station. A UE may perform a RACH procedure with the base station under many different conditions, such as, initial access to a cell provided by the base station, during a handover sequence from one cell to another, or re-initialization with the base station to re-synchronize with the base station. In some RACH procedures, a UE may generate a random access radio network temporary identifier (RA-RNTI) which is a temporary identifier used by UEs to receive random access responses (RAR) from the base station. Multiple UEs may perform RACH procedures with the same base station simultaneously. For example, if two UEs have RACH occasions in two different system frames but have the same symbol, slot, and frequency index, then both UEs will be associated with the same RA-RNTI. UEs having the same RA-RNTI may result in collisions between the two RACH requests which may reduce the RACH capacity of the network. Aspects presented herein provide a solution to the problem of multiple UEs having the same RA-RNTI by improving the manner in which a wireless device generates its RA-RNTI for RACH procedures. In some aspects, the technique utilized by UEs to generate the RA-RNTI for RACH procedures may be optimized to allow a UE to have an increased RAR window.

In an aspect of the disclosure, a method, a computer-readable medium, and an apparatus are provided for generating a RA-RNTI at a first UE for RACH procedures. The apparatus transmits a random access message. The apparatus receives a Random Access Response during a Random Access Response window in response to the random access message. In some aspects, the Random Access Response window may span at least two system frames. The apparatus determines one or more random access radio network temporary identifiers. In some aspects, each random access radio network temporary identifier may be determined based, at least in part, on a random access channel occasion. The apparatus may decode the Random Access Response based on the one or more random access radio network temporary identifiers.

In an aspect of the disclosure, a method, a computer-readable medium, and an apparatus are provided. The apparatus receives a random access message from a UE to initialize a RACH procedure. The apparatus determines an identifier of the UE based on a RA-RNTI, where the RA-RNTI is based, at least in part, on a random access channel occasion and a type of random access procedure. The apparatus transmits, to the UE based on the random access message, a RAR to complete the RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
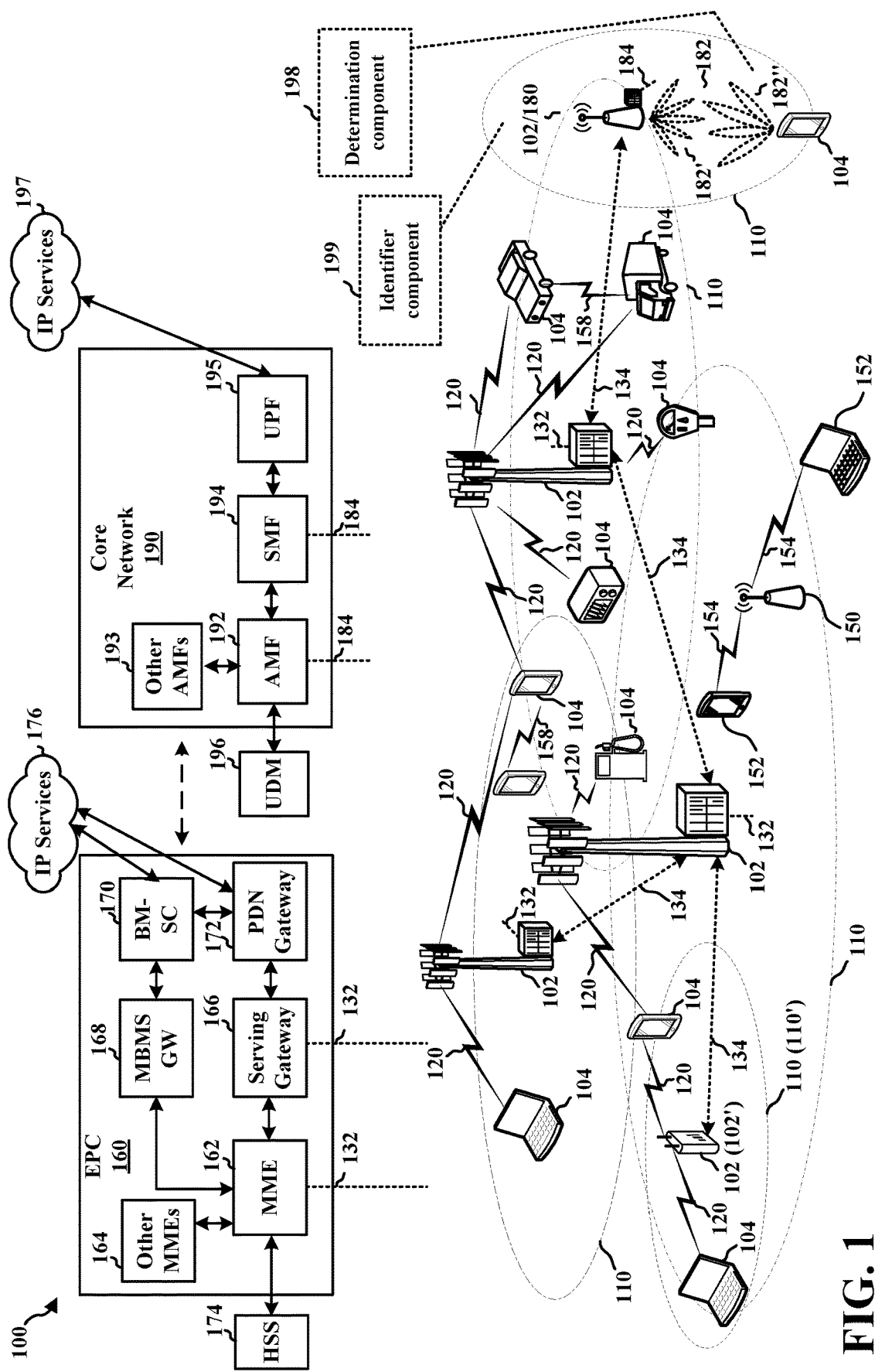
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to prevent collisions between two or more RACH requests between multiple UEs by improving the manner in which UEs generate RA-RNTI for RACH procedures. For example, the UE 104 of FIG. 1 includes a determination component 198 configured to receive a RAR during a RAR window in response to a random access message, and determine one or more RA-RNTI, where each RA-RNTI is based, at least in part, on a random access channel occasion. The UE 104 may decode the RAR based on the one or more RA-RNTIs.

Referring again to FIG. 1, in certain aspects, the base station 102/180 may be configured to process a random access message from the UE 104 to perform a RACH procedure. For example, the base station 102/180 of FIG. 1 includes an identifier component 199 configured to receive a random access message from the UE to initialize the RACH procedure, and determine an identifier of the UE based on a RA-RNTI, where the RA-RNTI may change based on a system frame. The base station 102/180 may transmit, to the UE 104 based on the random access message, a RAR to complete the RACH procedure.

Although the present disclosure may reference 5G New Radio (NR), the present disclosure may be applicable to other similar areas, such as LTE, LTE-A, Code Division Multiple Access (CDMA), Global System for Mobile communications (GSM), and/or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
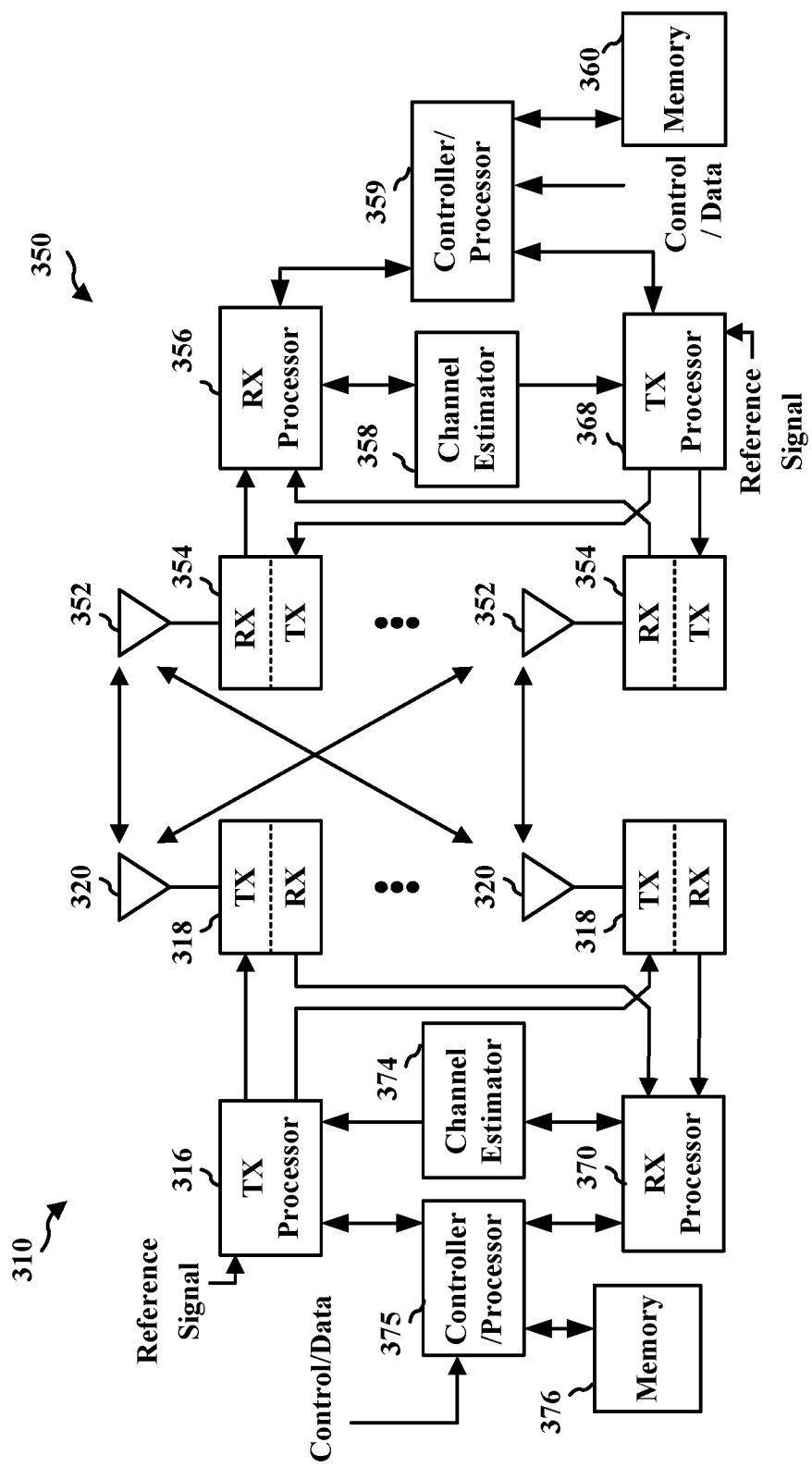
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
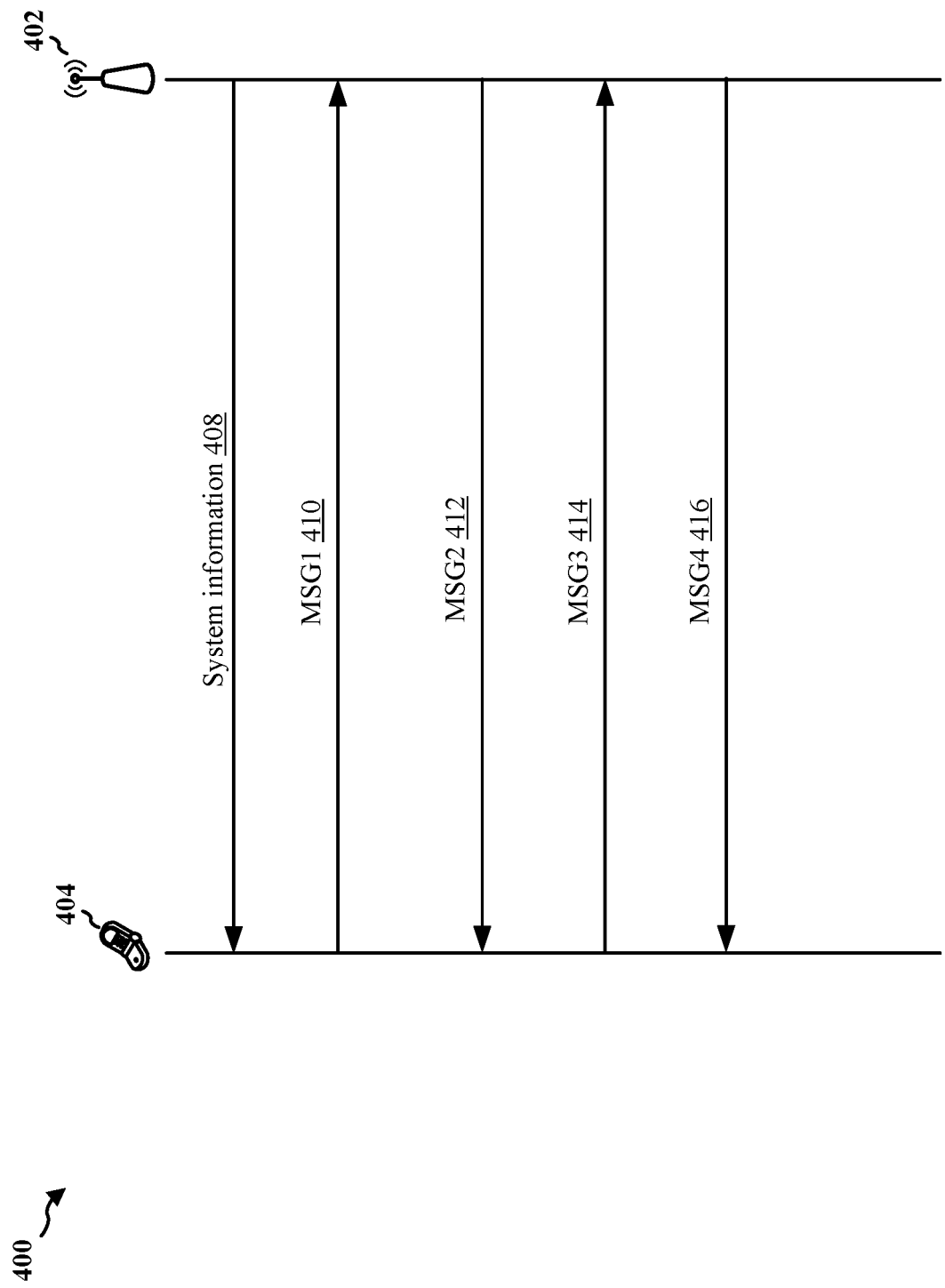
FIG. 4 is a call flow diagram illustrating an example of a four-step random access channel (RACH) procedure.

FIG. 4 illustrates a call flow diagram of a four-step RACH procedure in a wireless communications system 400. A base station 402 may be configured to provide a cell. For example, in the context of FIG. 1, the base station 402 may be embodied as the base station 102/180 and, accordingly, the cell may include a geographic coverage area 110 in which communication coverage is provided and/or a small cell 102' having a coverage area 110'. Further, the UE 404 may be embodied as the UE 104. In another example, in the context of FIG. 3, the base station 402 may be embodied as the base station 310 and the UE 404 may be embodied as the UE 350.

The UE 404 may perform the four-step RACH procedure in order to acquire uplink synchronization and/or acquire an uplink grant for a network. In one configuration, the UE 404 may acquire downlink synchronization prior to acquiring uplink synchronization, e.g., by acquiring at least one SS/PBCH block (as described with respect to FIG. 2B, supra).

The base station 402 may send (e.g., broadcast) one or more SIBs 408, which may indicate configuration information for performing the four-step RACH procedure. For example, the base station 402 may include information indicating at least a PRACH configuration, an available set of random access preambles, a random access response (RAR) window, an initial preamble transmission power, a power ramping factor, a maximum number of preamble transmissions, a contention resolution timer, and/or other information associated with a four-step RACH procedure.

The UE 404 may receive the one or more SIBs 408, and decode the one or more SIBs 408 to acquire the RACH configuration information. The UE 404 may determine a RA-RNTI in order to identify the preamble transmission for the RACH procedure. Based on the RACH configuration information, the UE 404 may determine (e.g., generate, select, etc.) a RACH preamble, which may correspond with the RA-RNTI and a random access preamble index. The UE 404 may include the RACH preamble and the RA-RNTI in the MSG1 410, and the UE 404 may send the MSG1 410 to the base station 402 on a set of resources indicated by the RACH configuration information.

The base station 402 may receive the MSG1 410 and, based on the MSG1 410, the base station 402 may generate a MSG2 412 comprising an RAR. For the MSG2 412, the base station 402 may generate and send DCI on a PDCCH masked with the RA-RNTI. The DCI may include data on a PDSCH, and the DCI may indicate the set of resources on which the UE 404 may detect the PDSCH. The base station 402 may generate the MSG2 412 to indicate a temporary cell RNTI (T-CRNTI) associated with the UE 404. Further, the base station 402 may generate the MSG2 412 to indicate a random access preamble identifier (RAPID), which may correspond with the random access preamble index used by the UE 404 for the MSG1 412. In addition, the base station 402 may determine a timing advance and/or an uplink grant (e.g., an uplink grant for when the UE 404 has data to send to the base station 402), and the base station 402 may generate the MSG2 412 to include information indicating the timing advance and/or uplink grant. The base station 402 may send the MSG2 412 to the UE 404, e.g., in a set of resources associated with the RA-RNTI included in the MSG1 410.

The UE 404 may monitor for the MSG2 412 in an RAR window, as indicated by the one or more SIBs 408. The UE 404 may receive the MSG2 412 in the RAR window, and may apply the timing advance indicated therein to acquire uplink timing synchronization. The UE 404 may generate a MSG3 414 based on the MSG2 412 (e.g., the MSG3 414 may also be referred to as an RRC connection request message and/or a scheduled transmission message). The MSG3 414 may establish a device identity for the UE 404 and, therefore, may the UE 404 may generate the MSG3 414 to indicate a cell RNTI (C-RNTI) and/or a core-network device ID associated with the UE 404. In the context of FIG. 1, for example, a core-network device ID may identify the UE 404 in the EPC 160 and/or core network 190). In a further configuration, the UE 404 may indicate a connection establishment clause in the MSG3 414. In still another configuration, the UE 404 may include information of the MSG3 414 (e.g., uplink data buffered by the UE 404) on a PUSCH, which may be assigned to the UE 404 by the uplink grant included in the MSG2 412. The UE 404 may send the MSG3 414 to the base station 402.

Responsive to the MSG3 414, the base station 402 may generate a MSG4 416. The base station 402 may generate the MSG4 416 to establish contention resolution and/or connection setup. The base station 402 may address the MSG4 416 toward the device identity indicated by the MSG3 414, such as the C-RNTI and/or core-network device ID. The base station 402 may send the MSG4 416 to the UE 404, which may complete the four-step RACH procedure when received by the UE 404.

As described, supra, the UE 404 may send a relatively small amount of data to the base station 402 during the four-step RACH procedure. For example, the UE 404 may send, to the base station 402, data buffered by the UE 404 at the time of the four-step RACH procedure on the PUSCH of the MSG3 414. The UE 404 may send such uplink data on the PUSCH of the MSG3 414 according to uplink grant and after acquiring uplink timing synchronization, as allocated by the base station 402 in the MSG2 412. However, without acquisition of a valid timing advance and application thereof for uplink timing synchronization, the four-step RACH procedure may not support such uplink data transmission by the UE 404 (e.g., transmission of a relatively small amount of data buffered by the UE 404 when performing the four-step RACH procedure).

As an alternative to a four-step RACH procedure (e.g., the four-step RACH procedure), a UE may perform a two-step RACH procedure. Such a two-step RACH procedure may include the exchange of two messages between the UE and a base station. Illustratively, the two-step RACH procedure may include a first message (e.g., msgA) that may combine various aspects of a MSG1 (e.g., the MSG1 410) and a MSG3 (e.g., the MSG3 414), and may further include a second message (e.g., msgB) that may combine various aspects of a MSG2 (e.g., the MSG2 412) and a MSG4 (e.g., the MSG4 416).

Thus, in a two-step RACH procedure, a UE may be able to send a relatively small amount of data in the first message, such as data buffered by the UE at the time of the two-step RACH procedure. For example, the UE may include a relatively small amount of data on a PUSCH of the first message. According to various configurations, a UE may include such a relatively small amount of data in a first message of a two-step RACH procedure when operating in one of multiple RRC modes, including an RRC Inactive mode, an RRC Idle mode, and an RRC Connected mode.

In performing a two-step RACH procedure instead of a four-step RACH procedure, signaling overhead, latency, and/or power consumption may be reduced. Moreover, spectral efficiency may be improved when performing a two-step RACH procedure instead of a four-step RACH procedure when a UE is operating in an RRC Connected mode.

However, in some instances, multiple UEs may perform RACH procedures with the same base station simultaneously, which may lead to performance issues. For example, if two UEs have RACH occasions in two different system frames but have the same symbol, slot, and frequency index, then both UEs will be associated with the same RA-RNTI. The UEs will be associated with the same RA-RNTI due to the RAR window. The RAR window is configured to be one system frame (e.g., 10 ms), which results in the RAR window repeating after each system frame. As such, if two RACH occasions are in two different system frames, but have the same symbol, slot, and frequency index, then they are associated with the same RA-RNTI.

In some procedures, the RAR window may need to be longer. For example, in a two-step RACH procedure, since the RACH request also contains a PUSCH payload (which includes at least the UE's identifier), the network may need additional time to process the UE's request. In another example, such as NR-U, the network may take additional or an extended period of time to obtain a channel before the RAR can be sent to the UE. As such, UEs in NR-U may need an extended or longer RAR window in order to receive the RAR and avoid missing a late RAR.

If an extended or longer RAR window (e.g., greater than one system frame) is used, but RA-RNTI calculation is based on the current formula, then there may be ambiguity in the RA-RNTI for multiple UEs. For example, if multiple UEs use RACH occasions in different system frames, but have the same symbol, slot, and frequency index, the RA-RNTIs will be the same. UEs having the same RA-RNTI may result in collisions between the two or more RACH requests which may reduce the RACH capacity of the network. Thus, there exists a need to optimize the manner in which UEs generate their RA-RNTI for RACH procedures to allow UEs to utilize an extended or longer RAR window.

The present disclosure relates to improving the manner in which a wireless device generates its RA-RNTI for RACH procedures. Optimizing the manner in which a wireless device generates it RA-RNTI for RACH procedures may allow UEs to utilize an extended or longer RAR window. For example, a UE in the network may be configured to wait an extended period of time to receive the RAR from the network before having to retransmit a random access message. In some aspects, collisions of RACH requests by multiple UEs may be reduced due to the improved RA-RNTI, which may further serve to properly identify the intended recipient of the RAR from the network.

Figure 5:
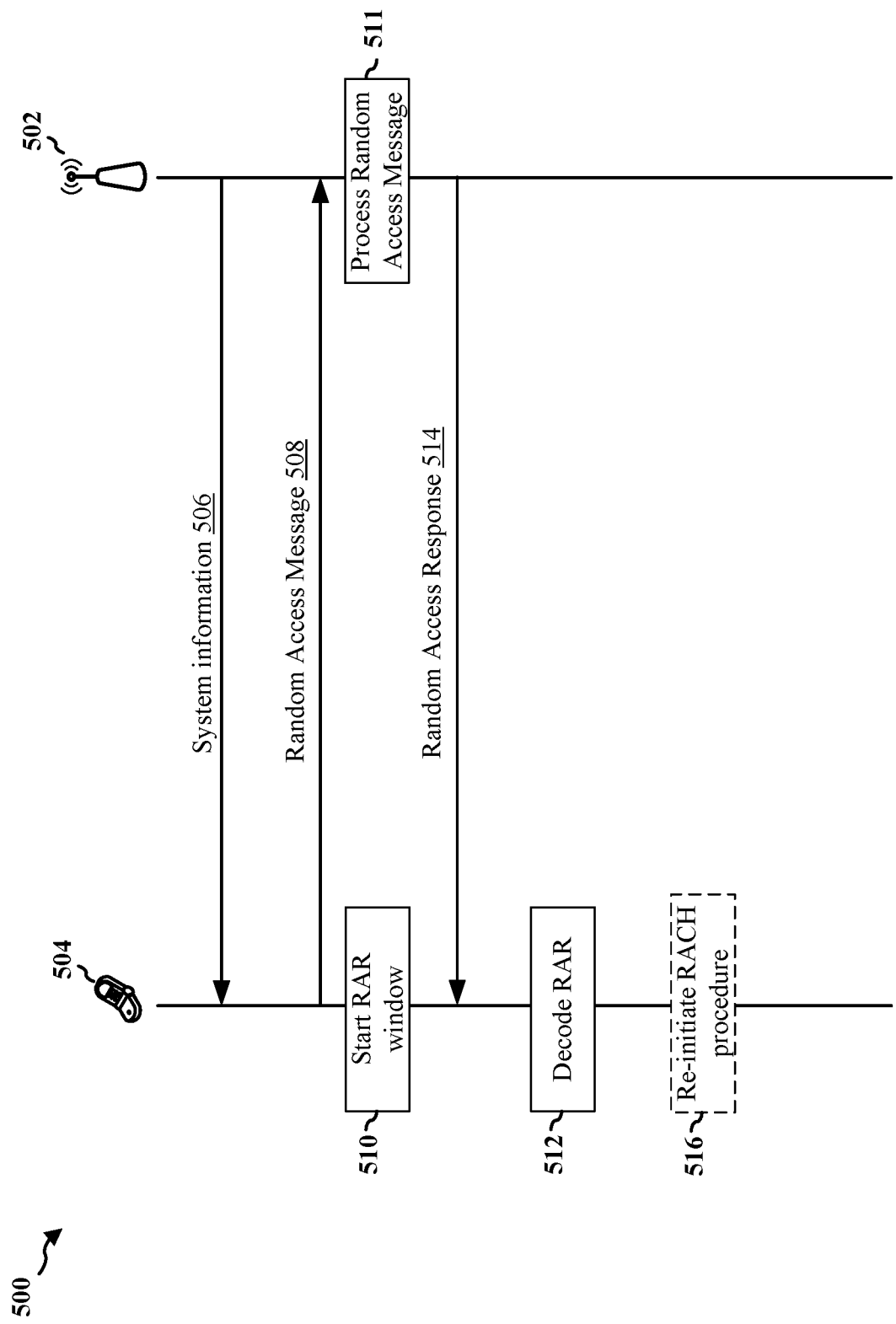
FIG. 5 is a call flow diagram illustrating an example of a RACH procedure in accordance with certain aspects of the disclosure.

FIG. 5 is a call flow diagram illustrating an example of a RACH procedure in accordance with certain aspects of the disclosure. The diagram 500 of FIG. 5 includes a UE 504 and a base station 502. The base station 502 may be configured to provide a cell. For example, in the context of FIG. 1, the base station 502 may correspond to base station 102/180 and, accordingly, the cell may include a geographic coverage area 110 in which communication coverage is provided and/or a small cell 102' having a coverage area 110'. Further, a UE 504 may correspond to UE 104. In another example, in the context of FIG. 3, the base station 502 may correspond to base station 310 and the UE 504 may correspond to UE 350.

The UE 504 may perform the two-step RACH procedure in order to acquire uplink synchronization and/or obtain an uplink grant for the network. The base station 502 may transmit system information 506 to the UE 504 which may indicate configuration information for performing the two-step RACH procedure. For example, the base station 502 may provide information indicating at least a PRACH configuration, an available set of random access preambles, a RAR window, an initial preamble transmission power, a power ramping factor, a maximum number of preamble transmissions, a contention resolution timer, and/or other information associated with a two-step RACH procedure. The UE 504 may receive the system information 506 and may decode the system information 506, such that the UE may perform the two-step RACH procedure.

The UE 504 may initiate the two-step RACH procedure by transmitting the random access message 508 to the base station 502. The random access message 508 may include a preamble and a payload. The random access message 508 may further include an identifier (e.g., RA-RNTI) which identifies the UE 504. The RA-RNTI is a temporary identifier used by the UE 504 to receive RARs. The UE 504 may generate the RA-RNTI based on the parameters associated with the random access occasion in the time domain. In some aspects, the RACH occasion may be located within a frame, and within such frame, the RACH occasion may be located within a particular symbol or multiple symbols.

An RA-RNTI may correspond to a random access channel occasion and type of random access procedure. The RA-RNTI may be defined based on an index of a first OFDM symbol of a PRACH occasion (s_id) (0≤s_id<14), an index of a first slot of the PRACH occasion in a system frame (t_id) (0≤t_id<80), an index of the PRACH occasion in a frequency domain (f_id) (0≤f_id<8), and an uplink carrier used for random access preamble transmission (uplink_carrier_id). For example:

$$RA\text{-}RNTI = 1 + s\_id + 14 \times t\_id + 14 \times 80 \times f\_id + 14 \times 80 \times 8 \times uplink\_carrier\_id$$

However, in some aspects, the UE 504 may generate the RA-RNTI based on at least a system frame number. In order to further indicate the identity of the UE 504, the formula to calculate the RA-RNTI may further include reference to the system frame associated with the RACH occasion. For example:

$$RA\text{-}RNTI = 1 + s\_id + 14 \times t\_id + 14 \times 80 \times f\_id + 14 \times 80 \times 8 \times uplink\_carrier\_id + 14 \times 80 \times 8 \times 2 \times rf\_id$$

The modified RA-RNTI may be defined based on an index of the system frame associated with the RACH occasion (rf_id) (0≤rf_id<N−1), where N is the number of system frames that the RAR window spans. In some aspects, each system frame may have an index in the range of [0, 1024). In some aspects, the system frame number may be determined based on a current system frame number and a number of system frames that the RAR window spans. The current system frame number may be the system frame in which the UE 504 receives the RAR. In some aspects, the system frame number may be based on a current system frame and a system frame during which the RACH occasion was transmitted, where the range of the system frame number is a number of system frames that the RAR window spans.

Figure 6:
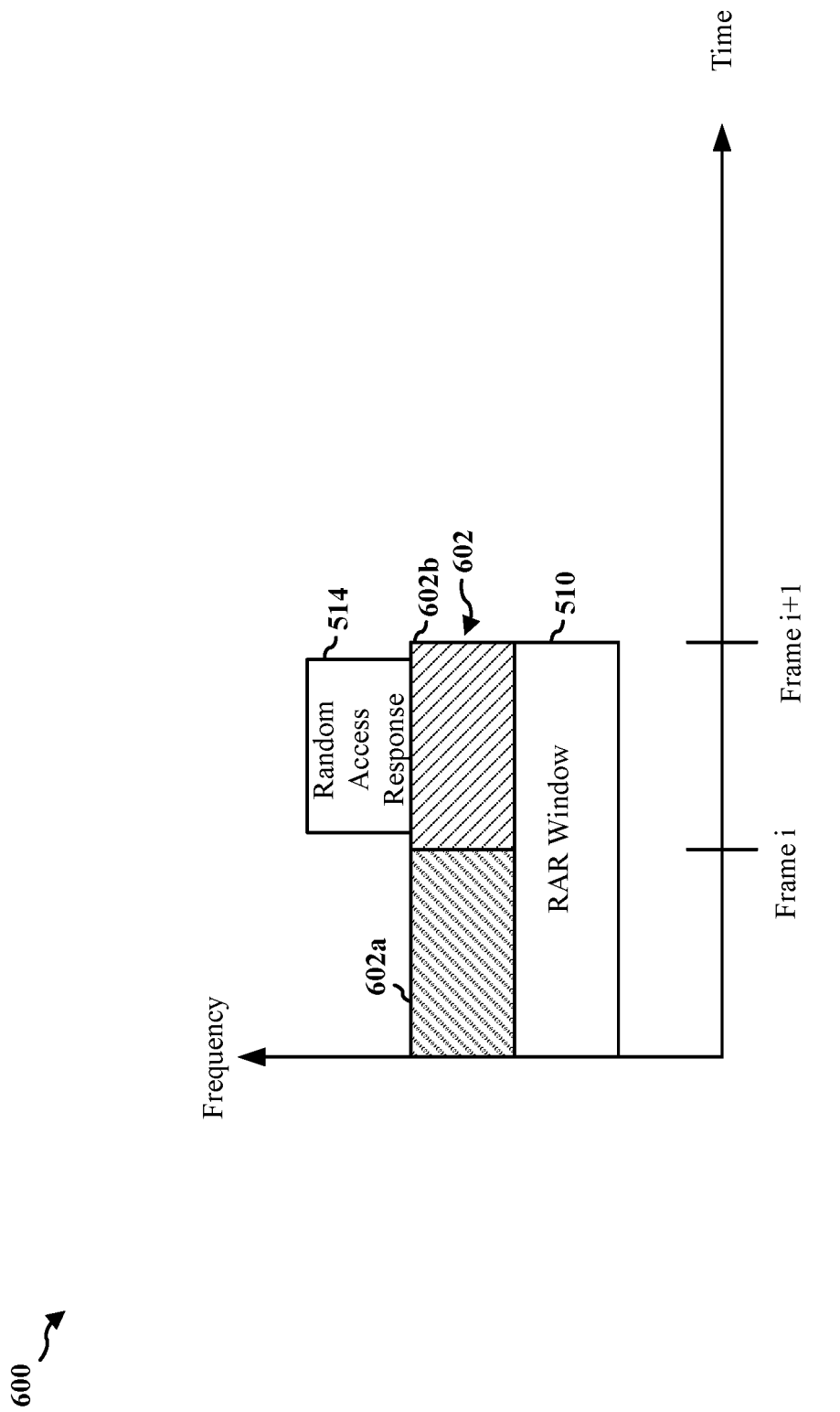
FIG. 6 is a diagram illustrating an extended RAR window in accordance with certain aspects of the disclosure.

In some aspects, the relative index of the system frame may be included in the calculation of the modified RA-RNTI. For example, the modified RA-RNTI may be defined based on a relative index of the system frame associated with the RACH occasion. For example, the relative index of the system frame (rf_id) may be the difference between the current system frame and the system frame in which the RACH occasion is located, where the range of the rf_id may be the number of system frames that the RAR window spans. For example, if the RAR window is 30 ms (e.g., spans 3 system frames), then the rf_id has a range of 0≤rf_id<3. In some aspects, as shown in FIG. 6, the UE 504, when monitoring for the RAR 514, may update its RA-RNTI 602 when the system frame increments. For example, the rf_id initially has a value of 0 for the first system frame (e.g., Frame i in FIG. 6), and if the UE 504 does not receive the RAR 514 after the first system frame, the UE 504 updates the rf_id to a value of 1 corresponding to the second system frame (e.g., Frame i+1 in FIG. 6), whereby the RA-RNTI would be recalculated based on the new value of rf_id. The value of the RA-RNTI 602 may change based on the system frame number. For example, as shown in FIG. 6, the first system frame (e.g., Frame i) has a corresponding RA-RNTI 602a. When the system frame increments to the next or second frame (e.g. Frame i+1), the next or second frame has a corresponding RA-RNTI 602b.

The modified RA-RNTI may be used for UE-specific scrambling, such that the modified RA-RNTI may identify the UE 504. As such, the modified RA-RNTI may prevent collisions between simultaneous RACH requests. At least one advantage of the disclosure, as shown in FIG. 6, is that the modified RA-RNTI allows the RAR window 510 to be expanded to two system frames (e.g., 20 ms), such that UEs may have an extended period of time to receive the RAR 514 from the base station. Expanding the RAR window 510 to two system frames increases the period of time that UEs will listen or monitor for the RAR 514, which in turn, provides the network with additional time to process the random access message from UEs. The expanded RAR window further provides the network with additional time to obtain a channel, in response to the random access message, for the UE, in instances where a channel is not presently available.

In addition to the preamble, the random access message 508 may include a payload. The payload may allow the UE 504 to transmit a relatively small amount of data to the base station 502. The payload may be at least partially on a PUSCH.

After the UE 504 transmits the random access message 508, the UE 504 may monitor for a RAR 514. The UE 504 may also start a RAR window 510 which the UE 504 is expected to receive the RAR 514. If the UE 504 does not receive the RAR 514 within the RAR window 510 and/or does not properly decode 512 the received RAR 514, then the UE 504 may re-initiate 516 the RACH procedure by re-transmitting the random access message 508.

In order to provide the RAR 514 to the UE 504, the base station 502 may monitor for a random access message 508 from the UE 504. In some aspects, the base station 502 may receive the random access message 508 and may process 511 the preamble and/or the payload of the random access message 508. In some aspects, the base station 502 may not properly process the random access message 508 such that the preamble and/or the payload was not detected and/or not properly detected. In such instances, the two-step RACH procedure may fail, whereby, the UE 504 may re-initiate the two-step RACH procedure.

The UE 504 may re-initiate the two-step RACH procedure if the RAR 514 is not received within the RAR window, or if the UE 504 receives an indication from the base station 502 that the random access message 508 was not properly processed. Conversely, the base station 502 informs the UE 504 that the random access message 508 was properly processed by transmitting the RAR 514. The RAR 514 may further include an acknowledgement to indicate that the random access message 508 was properly processed. Receipt of the RAR 514 within the RAR window 510 informs the UE 504 that the random access message 508 was properly processed, such that the UE 504 does not need to re-initiate the two-step RACH procedure.

Upon receipt of the RAR 514, the UE 504 may be configured to determine the RA-RNTI. In some aspects, the RA-RNTI may correspond to a random access channel occasion. As discussed above, the RA-RNTI may be based on a system frame number associated with the RACH occasion. In some aspects, the system frame number may be based on a current system frame number and a number of system frames that the RAR window (e.g., 510) spans. In some aspects, the system frame number may be based on a current system frame and a system frame during which the RACH occasion was transmitted, where a range of the system frame number may be a number of system frames that the RAR window spans.

Figure 7:
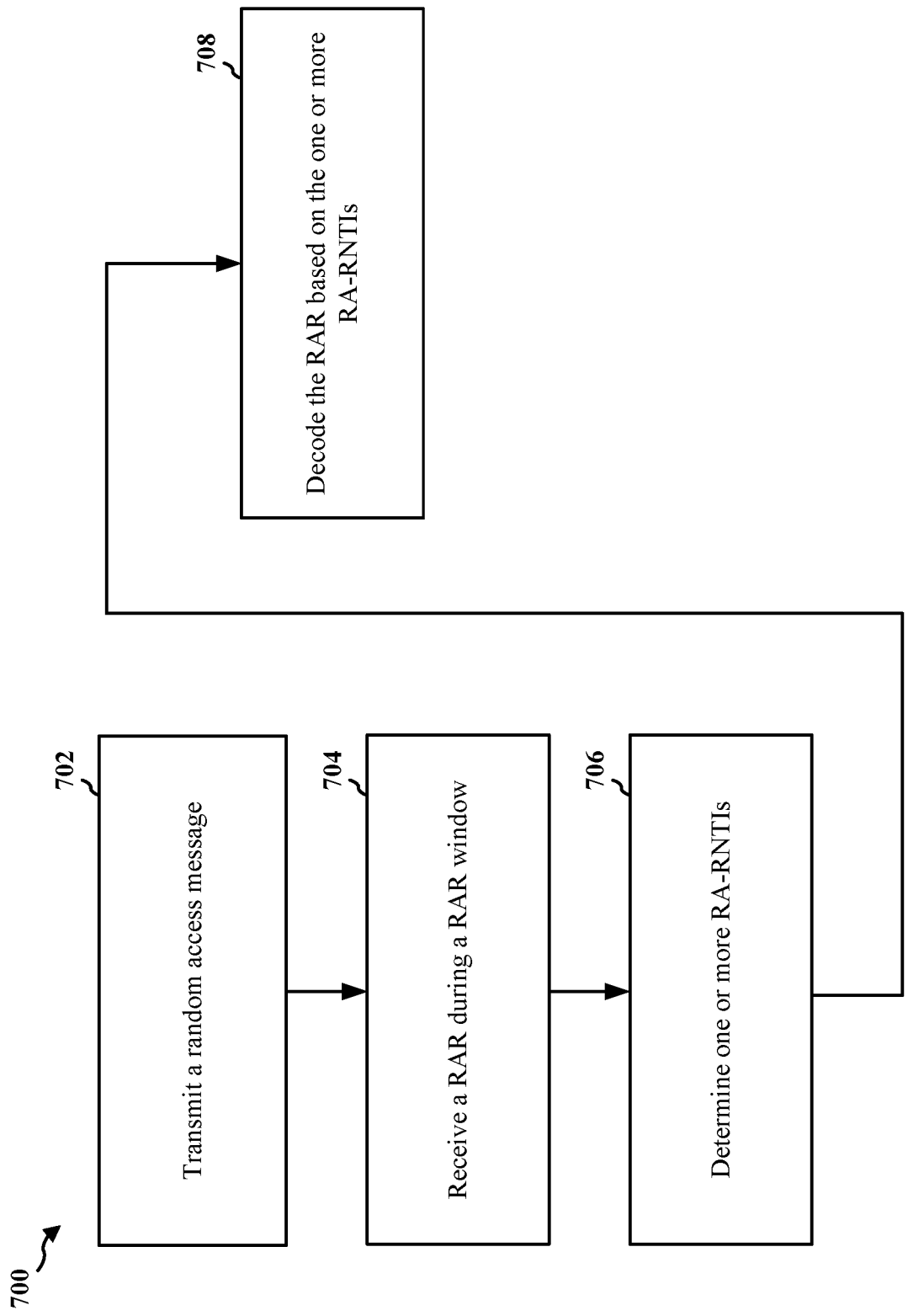
FIG. 7 is a flowchart of a method of wireless communication.

FIG. 7 is a flowchart of a method of wireless communication. The method may be performed by a UE or a component of a UE (e.g., the UE 104, 350, 504; the apparatus 802/802'; the processing system 914, which may include the memory 360 and which may be the entire UE or a component of the UE, such as the TX processor 368, the RX processor 356, and/or the controller/processor 359). According to various aspects, one or more of the illustrated operations of method 700 may be omitted, transposed, and/or contemporaneously performed. Optional aspects are illustrated with a dashed line. The method may enable a UE to generate a RA-RNTI for RACH procedures.

At 702, the UE may transmit a random access message (e.g., 508) as shown in connection with FIGS. 5 and 6. For example, 702 may be performed by transmission component 810 of apparatus 802. The UE (e.g., 504) may transmit the random access message (e.g., 508) to the base station 502 in order to initiate a RACH procedure.

At 704, the UE (e.g., 504) may receive a RAR (e.g., 514) during a RAR window (e.g., 510) in response to the random access message (e.g., 508). For example, 704 may be performed by reception component 804 of apparatus 802. In some aspects, the RAR window (e.g., 510) may span at least two system frames.

At 706, the UE (e.g., 504) may determine one or more RA-RNTIs. For example, 706 may be performed by determination component 806 of apparatus 802. The UE may determine the one or more RA-RNTIs based at least in part on a random access channel occasion and type of random access procedure. In some aspects, each RA-RNTI may correspond to a random access channel occasion and type of random access procedure. In some aspects, the one or more RA-RNTIs may include additional information associated with the type of random access procedure. In some aspects, the one or more RA-RNTIs may include additional information if the type of random access procedure is a two-step RACH procedure. In some aspects, each of the one or more RA-RNTIs may be based on a system frame number associated with a RACH occasion. In some aspects, the system frame number may be determined based on a current system frame number and a number of system frames that the RAR window spans. In some aspects, the system frame number may be based on a current system frame and a system frame during which the RACH occasion was transmitted, where a range of the system frame number is a number of system frames that the RAR window spans. In some aspects, the RA-RNTIs may comprise a plurality of RA-RNTIs. The plurality of RA-RNTIs may be based on at least one of a first symbol of a physical random access channel (PRACH) occasion, a first slot of the PRACH occasion in a system, frame, the PRACH occasion in a frequency domain, or an uplink carrier associated with transmission of a Random Access Preamble. In some aspects, the uplink carrier associated with transmission of the Random Access Preamble may provide an indication whether the transmission of the Random Access Preamble is over a supplemental uplink carrier.

At 708, the UE (e.g., 504) may decode the RAR (e.g., 514). For example, 708 may be performed by decode component 808 of apparatus 802. The UE may decode the RAR based on the one or more RA-RNTIs.

Figure 8:
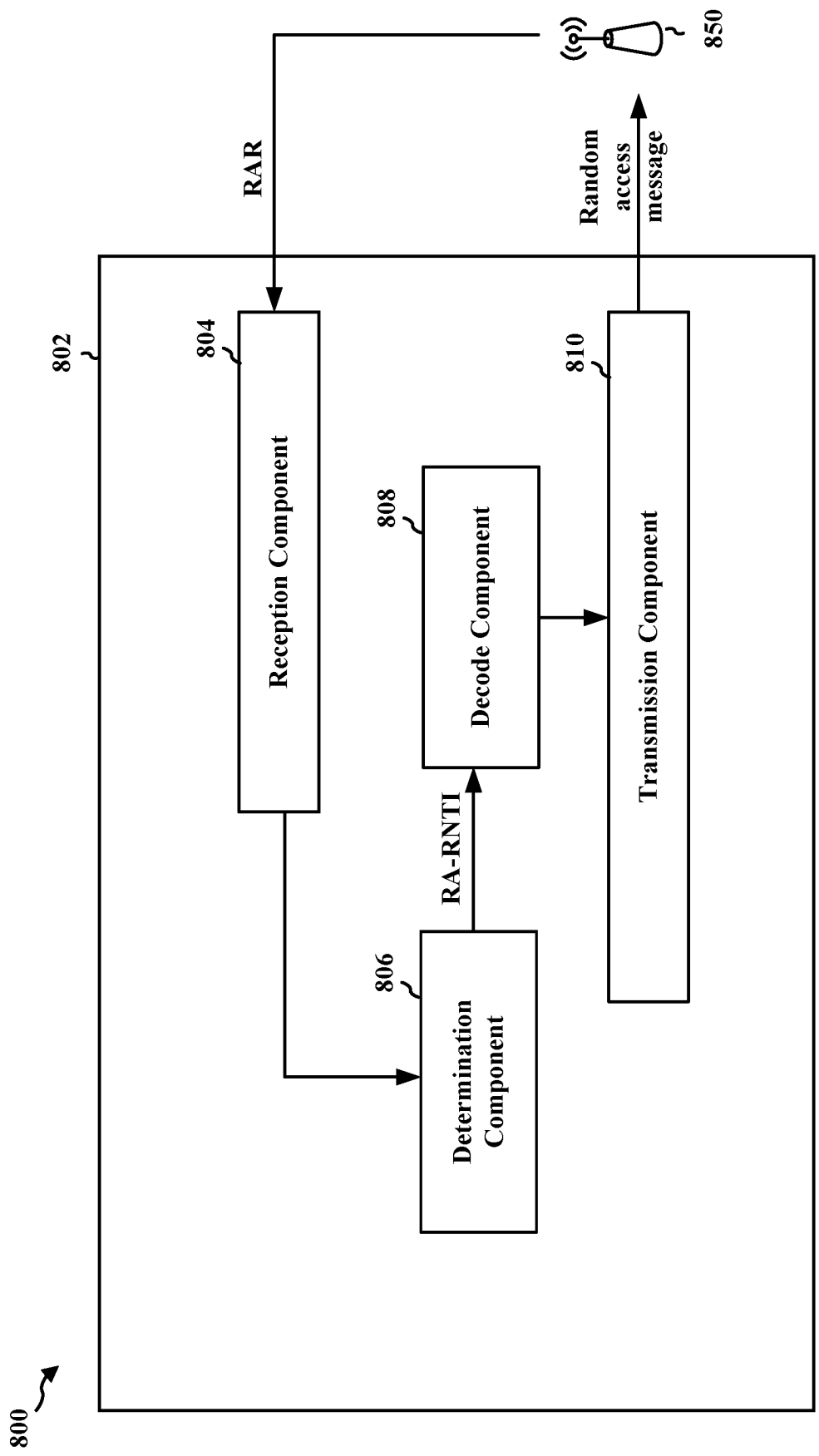
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE. The apparatus includes a reception component 804 that may receive a RAR during a RAR window, e.g., as described in connection with 704 of FIG. 7. In some aspects, the reception component 804 may receive the RAR during the RAR window in response to a random access message (e.g., 508). In some aspects, the RAR window (e.g., 510) may span at least two system frames, e.g., as described in connection with FIG. 6. The reception component 804 may receive the RAR (e.g., 514) from a base station (e.g., 502). The apparatus includes a determination component 806 that may determine one or more RA-RNTIs, e.g., as described in connection with 706 of FIG. 7. In some aspects, each RA-RNTI may correspond to a random access channel occasion. The apparatus includes a decode component 808 that may decode the RAR based on the one or more RA-RNTIs, e.g., as described in connection with 708 of FIG. 7. The apparatus includes a transmission component 810 that may transmit a random access message, e.g., as described in connection with 702 of FIG. 7. The transmission component 810 may transmit the random access message (e.g., 508) to the base station 850.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
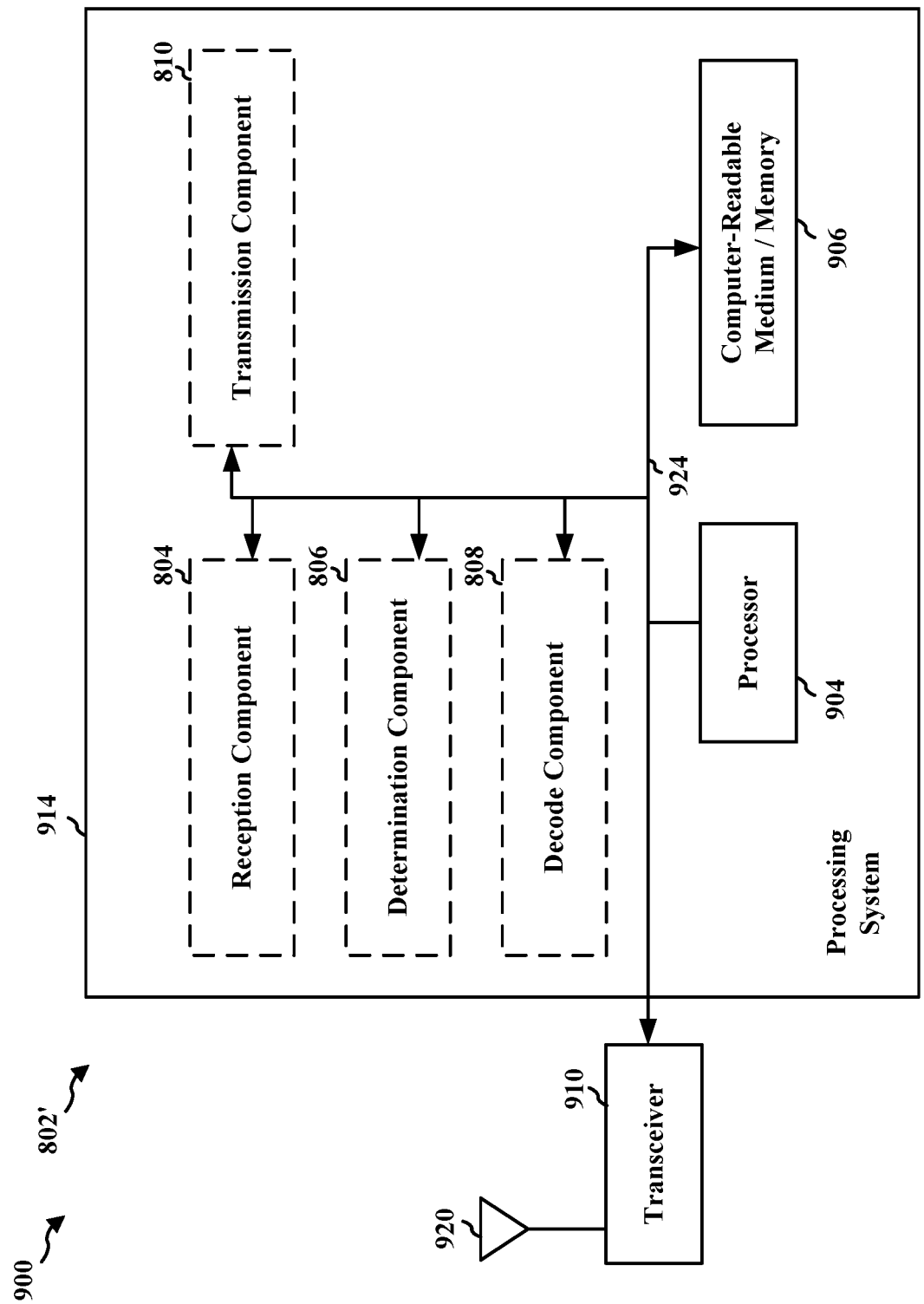
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for transmitting a random access message. The apparatus includes means for receiving a RAR during a RAR window in response to the random access message. The RAR window may span at least two system frames. The apparatus includes means for determining one or more RA-RNTIs. Each RA-RNTI corresponding to a random access channel occasion and type of random access procedure. The apparatus includes means for decoding the RAR bases on the one or more RA-RNTIs. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
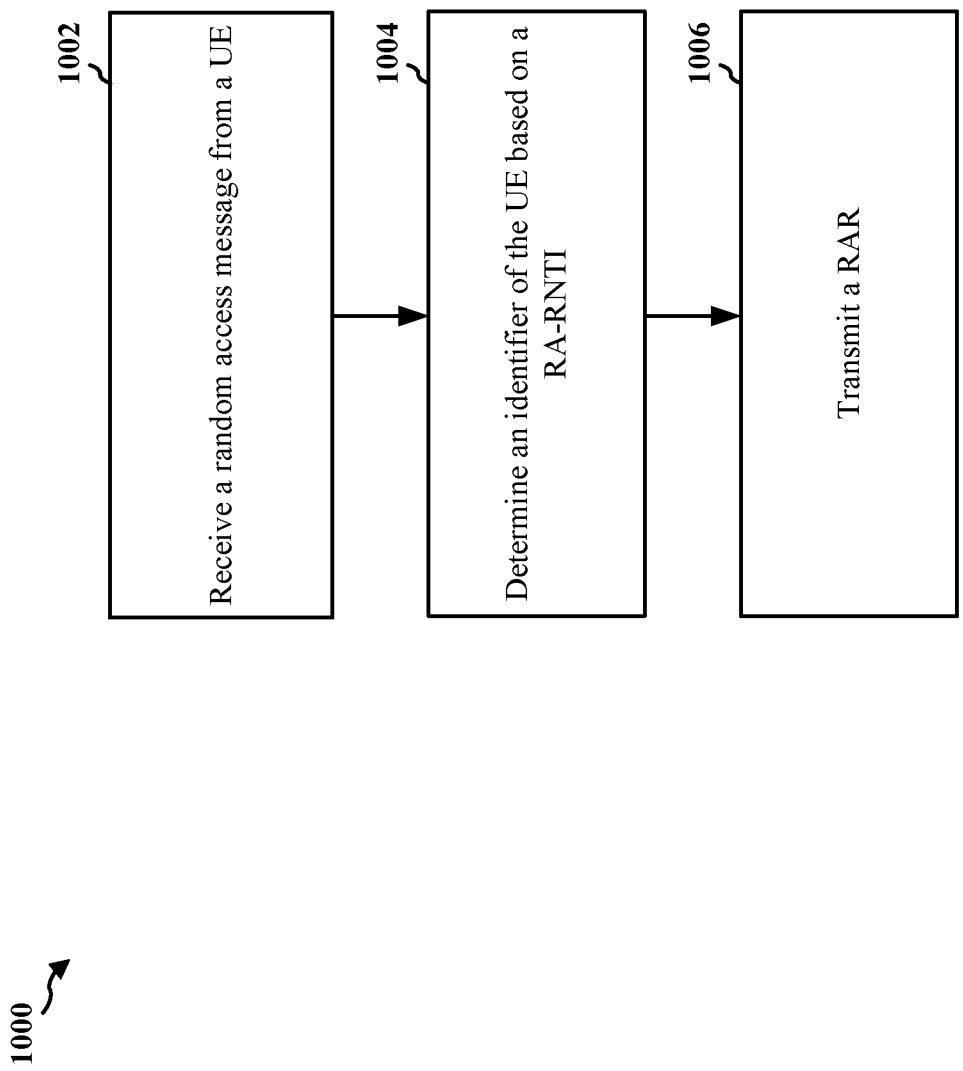
FIG. 10 is a flowchart of a method of wireless communication.

FIG. 10 is a flowchart 1000 of a method of wireless communication. The method may be performed by a base station or a component of a base station (e.g., the base station 102, 180, 310, 402, 502, 850; the apparatus 1102/1102; the processing system 1214, which may include the memory 376 and which may be the entire base station 502 or a component of the base station 502, such as the TX processor 316, the RX processor 370, and/or the controller/processor 375). According to various aspects, one or more of the illustrated operations of method 1000 may be omitted, transposed, and/or contemporaneously performed. Optional aspects are illustrated with a dashed line. The method may enable a base station to process a random access message from a UE to perform a RACH procedure.

At 1002, the base station may receive a random access message (e.g., 508) from a UE (e.g., 504) to initialize a RACH procedure. For example, 1002 may be performed by reception component 1104 of apparatus 1102.

At 1004, the base station may determine an identifier of the UE based on a RA-RNTI. For example, 1004 may be performed by identifier component 1106 of apparatus 1102. In some aspects the RA-RNTI may be based, at least in part, on a random access channel occasion and a type of random access procedure. In some aspects, the RA-RNTI may change based on a system frame. In some aspects the RA-RNTI may include additional information associated with the type of random access procedure. In some aspects, the one or more RA-RNTIs may include additional information if the type of random access procedure is a two-step RACH procedure. In some aspects, the RA-RNTI may be based on a system frame number associated with a RACH occasion. In some aspects, the system frame number may be determined based on a current system frame number and a number of system frames that a RAR window spans. In some aspects, the system frame number may be based on a current system frame and a system frame during which the RACH occasion was transmitted. In some aspects, a range of the system frame number may be a number of system frames that the RAR window spans. In some aspects, the RA-RNTI may be further based on at least one of a first symbol of a PRACH occasion, a first slot of the PRACH occasion in a system frame, the PRACH occasion in a frequency domain, or an uplink carrier associated with transmission of a Random Access Preamble. In some aspects, the uplink carrier associated with transmission of the Random Access Preamble may provide an indication whether the transmission of the Random Access Preamble is over a supplemental uplink carrier.

At 1006, the base station may transmit a RAR to complete the RACH procedure. For example, 1006 may be performed by transmission component 1108 of apparatus 1102. In some aspects, the base station may transmit the RAR to the UE based on the random access message.

Figure 11:
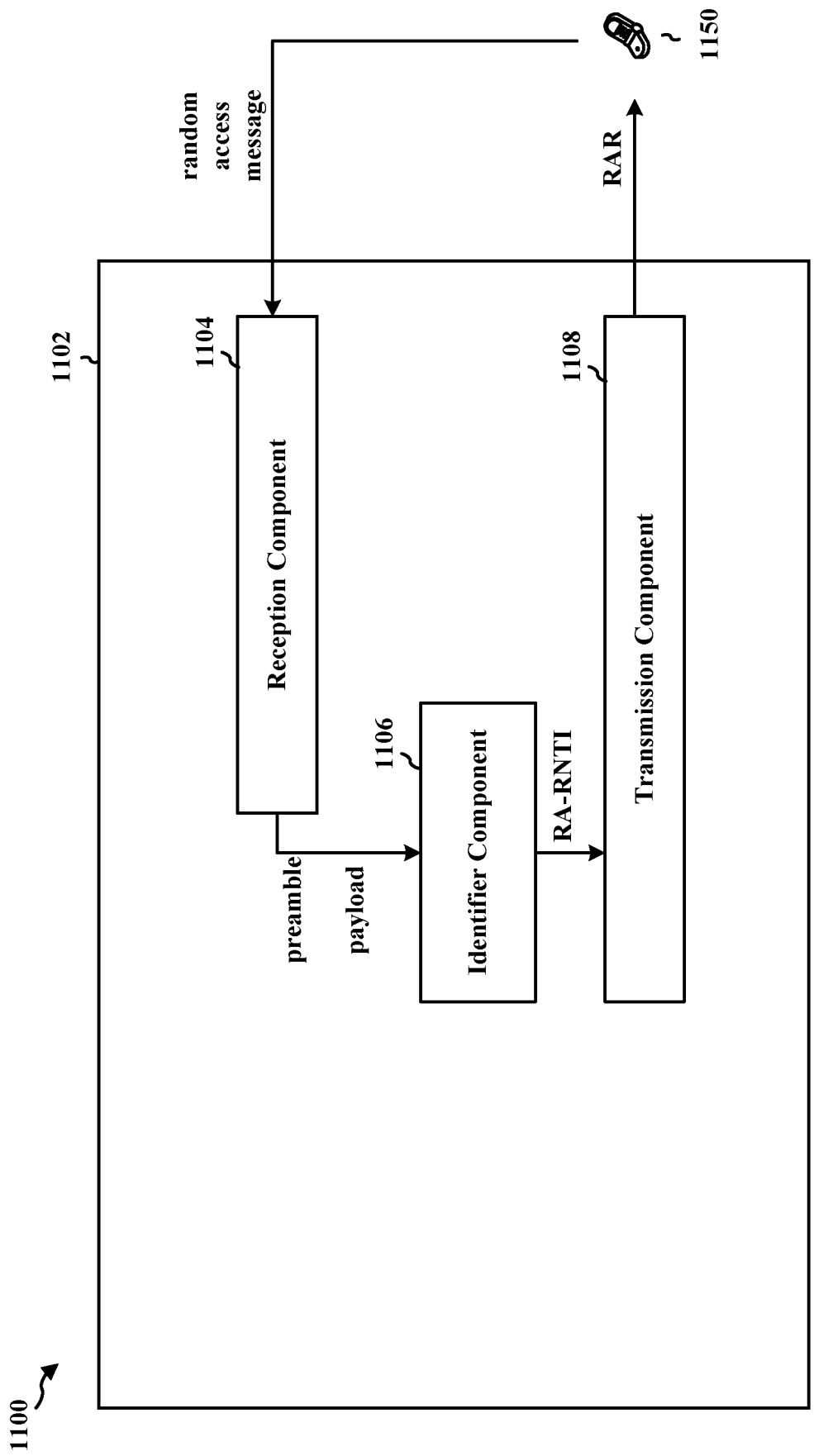
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station. The apparatus includes a reception component 1104 that may receive a random access message from a UE to initialize a RACH procedure, e.g., as described in connection with 1002 of FIG. 10. The apparatus includes an identifier component 1106 that may determine an identifier of the UE based on a RA-RNTI, e.g., as described in connection with 1004 of FIG. 10. In some aspects, the RA-RNTI may change based on a system frame. The apparatus includes a transmission component 1108 that may transmit a RAR to complete the RACH procedure, e.g., as described in connection with 1006 of FIG. 10. In some aspects, the transmission component 1108 may transmit the RAR to the UE 1150 based on the random access message.

The apparatus may include additional components that perform each of the blocks of the algorithm in the aforementioned flowchart of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
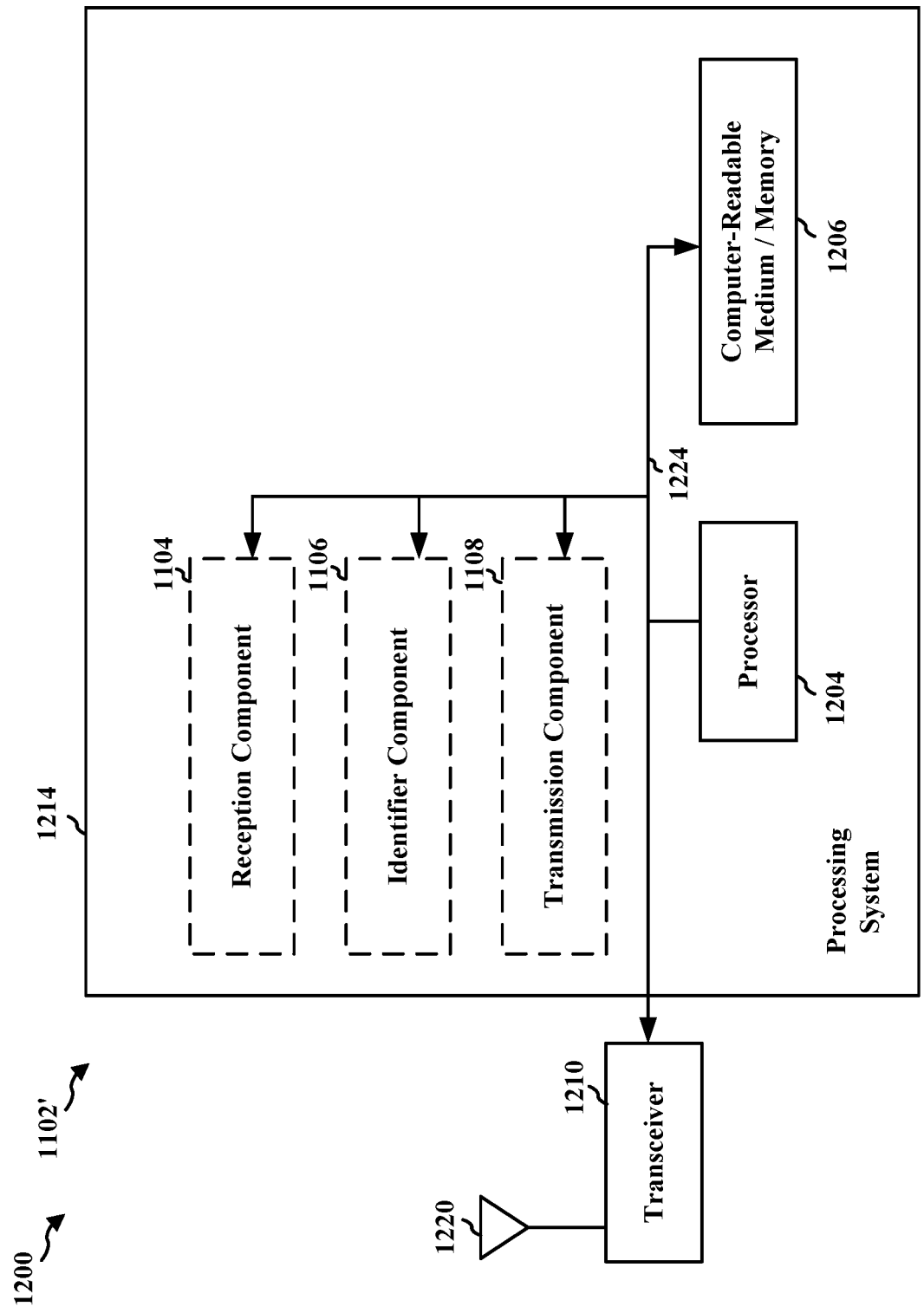
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof (Include if invention resides in the base station) The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for receiving a random access message from a UE to initialize a RACH procedure. The apparatus includes means for determining an identifier of the UE based on a RA-RNTI. The RA-RNTI may change based on a system frame. The apparatus includes means for transmitting a RAR to complete the RACH procedure. The RAR may be transmitted to the UE based on the random access message. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The disclosure provides an improved technique for UEs to generate a RA-RNTI for RACH procedures, which in turn allows UEs to have an increased RAR window. At least one advantage of the disclosure is that the modified RA-RNTI allows a RAR window to be expanded to two system frames (e.g., 20 ms), such that UEs may have an extended period of time to receive the RAR from a base station. Expanding the RAR window to two or more system frames increases the period of time that UEs will listen or monitor for the RAR, which in turn, provides the network with additional time to process the random access message from UEs. The expanded RAR window further provides the network with additional time to obtain a channel, in response to the random access message, for the UE, in instances where a channel is not presently available. In addition, including a system frame number in the calculation of the RA-RNTI allows the RA-RNTI to change based on a system frame, which can further assist in identifying the UE, and thus reduce or prevent collisions between simultaneous or a plurality of RACH requests by a plurality of UEs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    transmitting a random access message;
    receiving, in a system frame associated with a system frame number, a Random Access Response (RAR) during a RAR window in response to the random access message, the RAR window spanning at least two system frames;
    determining a random access radio network temporary identifier (RA-RNTI, where the RA-RNTI is determined based, at least in part, on a random access channel (RACH) occasion associated with the random access message and the system frame number; and
    decoding the RAR based on the RA-RNTI.

2. The method of claim 1, wherein the random access message includes additional information if the random access message is associated with a type of random access procedure that is a two-step random access channel (RACH) procedure.

3. The method of claim 1, wherein RA-RNTI is further determined based on an additional system frame number in which the RACH occasion is located.

4. The method of claim 3, wherein the RA-RNTI is based on a difference between the system frame number and the additional system frame number.

5. The method of claim 4, wherein a range of the difference between the system frame number and the additional system frame number is a number of system frames that the RAR window spans.

6. The method of claim 1, wherein the RA-RNTI is further determined based on a number of system frames that the RAR window spans.

7. The method of claim 1, further comprising determining a corresponding RA-RNTI for each system frame spanned by the RAR window, wherein each RA-RNTI is further based on at least one of:
 a first symbol of the RACH occasion;
 a first slot of the RACH occasion in a corresponding system frame;
 the RACH occasion in a frequency domain; or
 an uplink carrier associated with a transmission of a random access preamble.

8. An apparatus for wireless communication, comprising:
 memory; and
 at least one processor coupled to the memory and configured to:
  transmit a random access message;
  receive, in a system frame associated with a system frame number, a Random Access Response (RAR) during a RAR window in response to the random access message, the RAR window spanning at least two system frames;
  determine a random access radio network temporary identifier (RA-RNTIs), where the RA-RNTI is determined based, at least in part, on a random access channel (RACH) occasion associated with the random access message and the system frame number; and
  decode the RAR based on the RA-RNTI.

9. The apparatus of claim 8, wherein the random access message includes additional information if the random access message is associated with a type of random access procedure that is a two-step random access channel (RACH) procedure.

10. The apparatus of claim 8, wherein the RA-RNTI is further determined based on an additional system frame number in which the RACH occasion is located.

11. The apparatus of claim 10, wherein the RA-RNTI is based on a difference between the system frame number and the additional system frame number.

12. The apparatus of claim 11, wherein a range of the difference between the system frame number and the additional system frame number is a number of system frames that the RAR window spans.

13. The apparatus of claim 8, wherein the RA-RNTI is further determined based on a number of system frames that the RAR window spans.

14. The apparatus of claim 8, wherein the at least one processor is further configured to:
 determine a corresponding RA-RNTI for each system frame spanned by the RAR window, wherein each RA-RNTI is further based on at least one of:
  a first symbol of the RACH occasion;
  a first slot of the RACH occasion in a corresponding system frame;
  the RACH occasion in a frequency domain; or
  an uplink carrier associated with a transmission of a random access preamble.

15. A method of wireless communication at a base station, the method comprising:
 receiving a random access message from a user equipment (UE) to initialize a random access channel (RACH) procedure, wherein the random access message includes a first random access radio network temporary identifier (RA-RNTI) based, at least in part, on a RACH occasion;
 determining a second RA-RNTI for a Random Access Response (RAR) for the UE based, at least in part, on the first RA-RNTI and a system frame number associated with a transmission of the RAR; and
 transmitting, to the UE based on the random access message and the second RA-RNTI, the RAR to complete the RACH procedure.

16. The method of claim 15, wherein the random access message includes additional information if the random access message is associated with a type of the RACH procedure that is a two-step random access channel procedure.

17. The method of claim 15, wherein the first RA-RNTI is based on an additional system frame number associated with the RACH occasion.

18. The method of claim 17, wherein the second RA-RNTI is based on a difference between the system frame number and the additional system frame number.

19. The method of claim 18, wherein a range of the difference between the system frame number and the additional system frame number is a number of system frames that a RAR window spans.

20. The method of claim 17, wherein the second RA-RNTI is further based on at least one of:
 a first symbol of the RACH occasion;
 a first slot of the RACH occasion in a system frame;
 the RACH occasion in a frequency domain; or
 an uplink carrier associated with a random access preamble transmission.

21. The method of claim 15, wherein a RAR window spans at least two system frames and the second RA-RNTI is further determined based on a number of system frames that the RAR window spans.

22. An apparatus for wireless communication, comprising:
 memory; and
 at least one processor coupled to the memory and configured to:
  receive a random access message from a user equipment (UE) to initialize a random access channel (RACH) procedure, wherein the random access message includes a first random access radio network temporary identifier (RA-RNTI) based, at least in part, on a RACH occasion;
  determine a second RA-RNTI for a Random Access Response (RAR) for the UE based, at least in part, on the first RA-RNTI and a system frame number associated with a transmission of the RAR; and
  transmit, to the UE based on the random access message and the second RA-RNTI, the RAR to complete the RACH procedure.

23. The apparatus of claim 22, wherein the random access message includes additional information if the random access message is associated with a type of the RACH procedure that is a two-step random access channel procedure.

24. The apparatus of claim 22, wherein the first RA-RNTI is based on an additional system frame number associated with the RACH occasion.

25. The apparatus of claim 24, wherein an RAR window spans at least two system frames and the second RA-RNTI is further determined based on a number of system frames that the RAR window spans.

26. The apparatus of claim 24, wherein the second RA-RNTI is based on a difference between the system frame number and the additional system frame number.

27. The apparatus of claim 26, wherein a range of the difference between the system frame number and the additional system frame number is a number of system frames that a RAR window spans.

28. The apparatus of claim 24, wherein the second RA-RNTI is further based on at least one of:
    a first symbol of the RACH occasion;
    a first slot of the RACH occasion in a system frame;
    the RACH occasion in a frequency domain; or
    an uplink carrier associated with a random access preamble transmission.

* * * * *